United States Patent Office 3,129,251
Patented Apr. 14, 1964

3,129,251
PREPARATION OF POLYOLS FROM OLEFINS
Alfred J. Rutkowski, Colonia, N.J., assignor to Esso Research and Engineering Company, a corporation of Delaware
No Drawing. Filed Jan. 28, 1960, Ser. No. 5,107
3 Claims. (Cl. 260—635)

The present invention relates to a method for preparing polyols from polyolefins. In one aspect, it concerns the manufacture of non-vicinal glycols from diolefins. In another aspect, it relates to a method for preparing glycols in which the alcohol groups are attached to terminal carbon atoms from diolefins containing one or more internal double bonds.

Polyols, such as glycols and triols, are highly useful as gasoline additives and in the preparation of polyester polymers. Some of them are also employed as antifreezing agents in water cooling systems and the like. While the lower molecular weight glycols are readily prepared by conventional commercial methods, considerable difficulty has ben encountered in the manufacture of glycols and polyols from higher molecular weight polyolefins.

It has now been discovered that non-vicinal polyols can be prepared from polyolefins by making boron intermediates which are then oxidized to form polyols wherein there is a hydroxyl group for each boron-carbon bond that was in the boron intermediate. In addition to being useful in the preparation of polyalcohols, the boron intermediate readily isomerizes to shift the boron atom to a terminal carbon atom. This is an important feature of the invention because it permits the manufacture of glycols in which the two alcohol groups are attached to terminal carbon atoms from diolefins having one or more internal double bonds. Oxidation before isomerization would result in less reactive hydroxyl groups, e.g. secondary hydroxyl groups. Thus, the more reactive glycols, i.e. those containing two primary hydroxyl groups, may be obtained from any diolefin feed.

In accordance with the present invention, a polyolefin, especially a $C_3$ to $C_{15}$ diolefin, is contacted with a boron compound, usually a boron hydride or boron alkyl, under conditions which favor the formation of organic boron compounds in which a boron and hydrogen atom are added across each double bond in the olefin. These compounds, herein referred to as intermediates, are subsequently oxidized to form polyalcohols. If the polyolefin in the feed contains an internal double bond which forms a boron intermediate having the boron atom attached to an internal carbon atom, it is usually desirable to subject the intermediate to conditions hereinafter described which cause the boron atom attached to an internal carbon atom to shift to a terminal carbon atom prior to oxidizing the intermediate.

The olefin feed used in this proces may comprise a single polyolefin or a mixture of polyolefins. The preferred polyolefin compounds are conjugated or nonconjugated hydrocarbon compounds containing 4 to 8 carbon atoms. They may be acyclic diolefins, such as isoprene, butadiene-1,3, piperlyene, pentadiene-1,4, hexadiene-1,4, heptadiene-1,5 and octadiene-1,6; cyclic diolefins, such as cyclopentadiene, methyl cyclopentadiene, cyclohexadiene-1,3 and cyclooctadiene-1,4 are also useful. Aromatic diolefins, such as divinyl benzene and diallyl benzene, as well as cyclic triolefins, such as cyclododecatriene-1,5,9 may also be employed.

The boron compound, which is reacted with the polyolefin to make the intermediate compound, is preferably an inorganic borane, such as tetraborane, pentaborane, decaborane and especially diborane. Organo boron compounds, especially alkyl boron compounds, may also be used to prepare the boron intermediate. Suitable boron alkyl compounds include boron triethyl, boron triisobutyl, boron trihexyl, boron diethyl hydride, boron isobutyl dihydride, or any $C_2$ to $C_{12}$ alkyl boron compound. It is advisable to use a boron alkyl in which the carbon number of the alkyl group is at least two less than that of the olefin reactant. This difference in chain length facilitates the separation of any alkyl which is substituted by the olefin on the boron atom.

In the first step of a preferred embodiment in which an inorganic borane is employed, a sufficient amount of boron compound is contacted with the polyolefin, preferably in the liquid phase, at temperatures of −50 to 50° C. and under pressures ranging from subatmospheric to superatmospheric, e.g. up to 200 p.s.i.g. The reaction is exothermic and is generally complete within about 10 hours. Under optimum conditions, i.e. 0° to 30° C. and atmospheric pressure, the reaction is substantially instantaneous and is usually complete in 15 or 30 minutes depending upon the amount of reactants, heat transfer and other conditions. It has been noted that the reaction is promoted or catalyzed by the use of organic oxygenated compounds, especially $C_4$ to $C_6$ organic ethers, such as ethyl ether, dioxan, tetrahydrofuran, diethylene glycol dimethyl ether and the like. The amount of oxygenated compound employed may vary from as little as 0.1 wt. percent, based on the reactants, up to 300 or 400 wt. percent depending upon whether the oxygenated compound is being used merely as a promoter or whether it also serves the function of a solvent. Aside from the foregoing ethers, 15 to 400 wt. percent (based on the reactants) of inert $C_5$ to $C_{12}$ hydrocarbons such as pentane, heptane, benzene, cyclohexane, toluene, xylene, dodecane and other paraffinic and aromatic compounds may be added to the reaction zone as diluents. The atmosphere of the reaction zone should be inert and the reactants and diluents must be substantially anhydrous. Among the inert gases which are suitable for the purposes of the present invention are nitrogen, helium, and paraffinic hydrocarbon gases, such as methane and ethane.

The mole ratio of the reactants varies according to the particular olefin. In the case of diolefins, it will be found that 1 to 6 moles of olefin feed per mole of boron reactant will produce the desired intermediate compound. It is preferred to employ stoichiometric amounts so that all of the olefin reacts with the boron compound to produce an intermediate in which boron and hydrogen are added to each double bond in the olefin. The intermediate product is generally a low molecular weight polymeric compound in which the ratio of hydrocarbon radicals to boron atoms is about 1 to 1.5:1. The polyorgano borane intermediate compounds may be generically described by the following formula:

FORMULA I

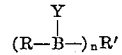

wherein B represents boron; R represents a hydrocarbon radical having 3 to 15 carbon atoms; and R' represents a terminal group which may be hydrogen, a saturated hydrocarbon radical, an unsaturated hydrocarbon radical, an alkoxy radical or a hydroxyl radical, each said hydrocarbon radical having 3 to 15 carbon atoms. The unsaturated hydrocarbon radical may be joined with another unsaturated hydrocarbon radical by a boron atom to form a cyclic terminal radical. Y represents hydrogen, $C_3$ to $C_{15}$ hydrocarbon, alkoxy, hydroxy or

and $n$ represents an integer from 2 to 200. Thus, when R and R' are hydrocarbon radicals and Y represents

a segment of the polymeric structure may be represented by the following formula:

FORMULA II

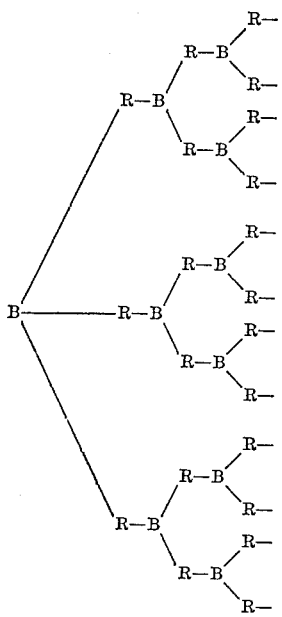

When all of the Y's represent hydrogen atoms, the structure of the polymer may appear as typified by the following formula:

FORMULA III

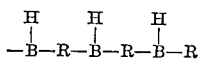

In Formula II it will be noted that each boron atom shares 3 hydrocarbon radicals with 3 other boron atoms, an overall ratio of hydrocarbon radicals to boron atom of 1 to 0.5:1. In Formula III this ratio is 1:1 and, of course, some hydrogen atoms may displace some of the R's in Formula II to effect a ratio of hydrocarbon radical to boron atom somewhere between 1 to 0.5:1 and 1:1. All of the polymeric compounds have in common the following radical:

FORMULA IV

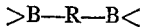

As mentioned above, the low molecular weight polyorgano borane can be prepared by reacting a trialkyl boron or dialkyl boron monohydride with a diolefin. For instance in the following equation 2 moles of a dialkyl boron hydride, e.g. diethyl boron hydride, or more commonly tetraethyldiborane, is reacted with 1 mole of allene:

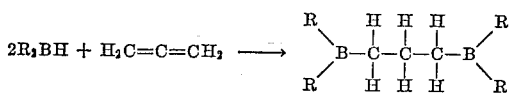

R is a hydrocarbon radical in the above equation.

To effect the higheset ratio of hydrocarbon radicals to boron atoms, it is preferred to employ at least 0.75 mole of hydrocarbon polyolefin per boron atom in the boron reactant. Thus, with diborane a mole ratio of diolefin reactant to diborane of at least 3 to 1 would be employed. If it is desired to produce a compound more linear in structure and containing some boron to hydrogen bonds, a ratio less than 1 to 1.5 moles of hydrocarbon reactant per boron atom in the reactant would be employed. Thus, stoichiometric amounts required to synthesize the polymer of Formula III are a ratio of 1 mole of hydrocarbon reactant per boron atom in the borane reactant or, as an example, 2 moles of diolefin reactant per mole of diborane.

When boron alkyls, particularly boron trialkyls are reacted with the polyolefins in accordance with the present invention, the reaction should be carried out between about 50° and 250° C. under pressures ranging from approximately atmospheric to 5000 p.s.i.g. for from a few minutes to 24 hours or more. This first step of the process may be carried out in the presence or absence of solvents or diluents as mentioned above where inorganic boron hydrides were the reactants. The optimum conditions for the reaction are temperatures of 100° to 150° C., pressures of atmospheric to 3000 p.s.i.g. and reaction times of 1 to 8 hours. The boron alkyl and the olefin may be contacted in either the vapor or liquid phase. If a liquid phase reaction is used, it is desirable to mix the reactants with an efficient stirrer in order to shorten the reaction time. It is also advantageous to have good contact between the olefin and boron alkyl when the reaction occurs in the vapor phase. The amounts of reactants employed are preferably stoichiometric although olefin to boron alkyl mole ratios may vary from about 1 to 6:1 where the olefin is a diolefin. The ratio of the reactants should be so adjusted that all unsaturation is converted to boron-carbon bonds so that the optimum amount of polyol product is obtained from the intermediate compound.

The intermediate compound, regardless of whether it is formed from a boron alkyl or an inorganic boron hydride, is next oxidized with molecular or atomic oxygen, which may be derived from air, organic or inorganic peroxides and any other compound which releases oxygen under the reaction conditions, to form a borate ester. Among the inorganic and organic peroxides which may be employed as a source of oxygen are hydrogen peroxide, persulfuric acid, performic acid, benzoyl peroxide, tert-butyl peroxide and the like.

Since each of the three bonds between the boron atom and the carbon atoms oxidizes at a different rate, it is advisable to adjust the oxidation to permit the greatest recovery of polyalcohols. The first boron-carbon bond oxidizes quite readily and therefore it is necessary to use only a stoichiometric amount of oxygen to oxidize this bond. The second and third bonds are somewhat more difficult to oxidize and thus, as the oxidation proceeds, it will be found that it is beneficial in some cases to use up to 10 mole percent excess of oxygen in order to completely oxidize the boron intermediate compound. If the oxidizing agent is gaseous it may be bubbled through the liquid intermediate at temperatures of −30 to 150° C. for from a few minutes to a day or more at pressures ranging from atmospheric to 5000 p.s.i.g. Liquid oxidizing agents may be added to the intermediate in the proper amount and the resultant mixture is then allowed to react for a suitable length of time. Again, stirring may be used in order to insure a good contact between the oxidizing agent and the intermediate compound. It will be found that most of the oxidation reactions can be carried out between about −10 and 100° C. for about 1 hour to 8 hours. The initial pressure can be atmospheric and later the pressure can be increased, e.g. from 1 to 3000 p.s.i.g., to facilitate the oxidation of the second and third boron-carbon bonds. Since some of the boron intermediates are viscous liquids or semi-solids, it is generally advantageous to employ about 0.1 to 400 wt. percent of an inert diluent or oxygenated organic solvent, based on the reactants. The same diluents and solvents used in the first step of the proces may also be employed here. In general, it will be found that $C_4$ to $C_{12}$ paraffinic, aromatic, cycloaliphatic and ether diluents and solvents mentioned above are satisfactory.

The oxidized intermediate, i.e. the borate ester, can be converted to the polyalcohol product by hydrolyzing it with water or dilute, e.g. 1 to 50 wt. percent, aqueous solutions of an active inorganic acid or caustic, such as sulfuric acid, hydrochloric acid, potassium hydroxide or sodium hydroxide. The hydrolysis product comprises the polyalcohol and either boric acid or a borate salt, depending upon whether an acid or base is used in the hydrolysis of the intermediate compound. The hydrolysis reaction takes place quite rapidly at a temperature of 0 to 120° C. For instance, at temperatures of 30 to 70° C. the reaction is complete within 1 minute to 2 hours. Following the hydrolysis of the oxidized intermediate compound, substantially pure polyalcohol may be recovered from the mixture by removing the boric acid or alkali metal borate by filtering and distilling the water from the reaction mixture.

If the polyolefin reactant in the first step of the process contains an internal double bond the intermediate boron compound may be isomerized so that each of the alcohol groups is attached to primary carbon atoms. This feature of the invention has special application to $C_5$ and higher diolefins which have double bonds between two secondary carbon atoms, such as piperylene. In this embodiment of the invention, the boron intermediate is heated in the presence or absence of the above-mentioned oxygenated compounds to temperatures of 25 to 250° C. for from a few minutes to 20 hours under atmospheric to superatmospheric pressure. It is preferred to carry out the isomerization reaction at 150 to 200° C. for about 1 to 8 hours and pressures ranging from atmospheric to about 1000 p.s.i.g., in the presence of catalyzing quantities of organic ether, especially diethylene glycol dimethylether. Amounts of organic ethers similar to those employed in the first step of the reaction may be used in this isomerization reaction, e.g. 0.1 to 300 to 400 wt. percent, based on the intermediate compound. The following equations illustrate the isomerizations of tri-sec-butylborane and tri-tert-butylborane:

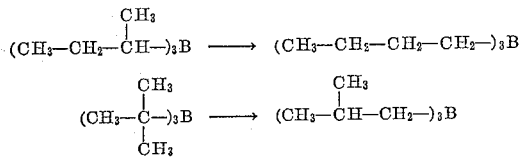

Upon completion of the isomerization reaction, the intermediate may be oxidized in accordance with the method described above and subsequently hydrolyzed to recover the polyalcohol product.

The process of the present invention will be better understood by referring to the following specific examples:

*Example 1*

Into a one liter, four-neck flask equipped with a reflux condenser, stirrer, thermowell and a fritted glass tip gas inlet tube that had previously been flushed with dry nitrogen, was placed 210 g. (3 moles) of piperylene dissolved in 185 ml. of ethyl ether. The diborane gas, which was admitted through the fritted glass tip gas inlet tube, was continually generated from 68.2 g. (1.9 moles) of sodium borohydride dissolved in 500 ml. of diethylene glycol dimethyl ether and 338.4 g. (2.4 moles) of boron trifluoride ethyl etherate dissolved in 250 ml. of diethylene glycol dimethyl ether. The diborane was allowed to flow into the flask for a period of 8 hours. The temperature of the reaction of diborane with piperylene ranged from 25° to 40° C. After complete addition of the diborane to the piperylene, the ether was removed from the boron alkyl by distillation. The boron alkyl was then distilled, and a portion of the residue, after removing the boron-containing compounds boiling up to 77° C. at 0.01 mm., was subjected to the following isomerizing conditions:

Into a 250 ml. two-neck flask equipped with a thermowell, condenser and a magnetic stirring bar, was placed 58 g. (0.25 mole) of the residue described above which had a molecular weight of 232 and contained 10.32% boron together with 50 ml. of diethylene glycol dimethyl ether. The flask was heated to 165° C. and held at that temperature for 7 hours. The diethylene glycol dimethyl ether was removed by washing with water.

The isomerized boron alkyl was then oxidized as follows: Into a 400 ml. four-neck flask fitted with a stirrer, condenser, thermowell and 125 ml. dropping funnel was placed 58 g. (0.25 mole) of the product from piperylene and diborane (molecular weight of 232) and 100 ml. of absolute ethanol. To this solution was added 24 g. of sodium hydroxide. The temperature was lowered to 5° C. and 200 g. of 30 wt. percent hydrogen peroxide were added slowly over a 4 hour period. The temperature was maintained below 20° C. The reaction mixture was heated to 50° C. for 1 hour after complete addition of the hydrogen peroxide.

The solid present was filtered and the liquor was separated. The solid was refluxed with water for 2 hours and extracted with ether. The ether extraction was combined with the original liquor and the solvents, the ether and ethanol removed by distillation. The residue on distillation yielded 48.5 g. of product B.P. 93° C. at 0.8 mm. which was identified as 1,5-pentanediol partly on the basis of the following data:

| | Refractive Index, $n_D^{20}$ | Percent Oxygen | Percent Carbon | Percent Hydrogen |
|---|---|---|---|---|
| Literature or theoretical | 1.4499 | 30.08 | 57.7 | 11.5 |
| Found | 1.4513 | 29.77 | 58.1 | 11.4 |

*Example 2*

Into a one-liter, four-neck flask equipped with a reflux condenser, stirrer, thermowell and a fritted-glass tip gas inlet tube that had been flushed with dry nitrogen, was placed 210 g. (3 moles) of isoprene dissolved in 50 ml. of anhydrous ethyl ether. Diborane gas, generated as described above, was admitted through the gas inlet tube over a four hour period. During the reaction some ether and isoprene was lost through evaporation. To prevent excessive evaporation a heptane-carbon dioxide bath was used to keep the reaction flask at 15° C. An additional 150 ml. of ethyl ether was added to maintain the gas inlet tube below the liquid. At the end of the 4 hour period, the reaction mixture was transferred to a distilling flask and after the ethyl ether was removed the boron alkyl was distilled under vacuum.

The product boiling between 57–60° C. at 0.3 to 0.1 mm. of mercury was oxidized as follows:

Into oxidation equipment similar to that used in Example 1 was placed 46.4 g. (0.2 mole) of the product from diborane and isoprene described above. The boron intermediate was diluted with 200 ml. of alcohol and to the diluted intermediate was added 24 g. of NaOH. The mixture was cooled by an ice bath and thereafter 164.6 g. of 30% $H_2O_2$ were added slowly. After complete addition, the reaction mixture was stirred for an additional 1½ hours. After extraction with ethyl ether, the solvents were removed by distillation and there was obtained 35 g. of 2-methyl-1,4-butanediol which boiled at 97 to 98° C. under 1.5 to 1.6 mm. of mercury and had a refractive index of $n_D^{20}=1.4496$.

*Example 3*

Into a two-liter, four-neck flask equipped with a stirrer, condenser, thermowell and fritted glass tip gas inlet tube was placed 972 g. (6 moles) of cyclododecatriene-1,5,9 dissolved in 300 g. of anhydrous ethyl ether. Diborane was generated in similar equipment described in Example 1 from 1025.2 g. (6 moles) of boron trifluoride ethyletherate dissolved in 500 ml. of diethylene glycol dimethyl ether and 204.6 g. (5.3 moles) of sodium borohydride dissolved in 200 ml. of diethylene glycol dimethyl ether. The equipment was previously flushed with dry nitrogen. The diborane was generated over fourteen hours. The reaction mixture was very viscous and was transferred to a vacuum desiccator. The ether was removed by applying a vacuum to the desiccator. The last traces of ether were removed by heating the desiccator on a steam bath while evacuating it with a vacuum pump.

Into a five-liter four-neck flask equipped with a stirrer, condenser, thermowell and 500 ml. dropping funnel was placed 358 g. of the product prepared as above. This was dissolved in three liters of a 4/1 n-heptane-isopropyl alcohol mixture and 88 g. of sodium hydroxide was added to the mixture. To this reaction mixture was added 476 g. of 30 wt. percent hydrogen peroxide with stirring at a rate such that the temperature was maintained between 30–35° C. Complete addition of the hydrogen peroxide required 6 hours. The heptane and isopropyl alcohol were removed by evaporation on a steam bath. The resulting product was converted to the acetates, using acetic anhydride, and distilled. Analysis of the acetates showed that cyclododecanetriol was obtained in 14% yield, cyclododecenediol in 82% yield and cyclododecadiene alcohol in a 5% yield. It is interesting to note that both a diol and triol were prepared by the above process.

*Example 4*

Into a 500 ml. two-neck flask equipped with a reflux condenser and thermowell is placed 36.4 g. (0.2 mole) of triisobutyl borane and 28.8 g. (0.3 mole) of heptadiene 1,6. The equipment is previously flushed with dry nitrogen. The flask is heated to reflux and the isobutylene evolves and is collected in a Dry Ice acetone trap. When a total of 33.6 g. of isobutylene is evolved the reaction flask is cooled to room temperature.

Into a 500 ml. four-neck flask equipped with a stirrer, condenser, thermowell and 125 ml. dropping funnel is placed 31 g. of the reaction product described above dissolved in 200 ml. of ethyl alcohol. To this is added 8 g. of sodium hydroxide. This mixture is cooled in a wet ice bath and the temperature is maintained at 20° C. while 100 g. of 30% $H_2O_2$ is added over a three hour period. The reaction mixture is heated to 50° C. with stirring to insure complete oxidation and hydrolysis.

The solid present is filtered and the liquor separated. The solid is refluxed with water for one hour and extracted with ethyl alcohol. The alcohol solutions are combined and the ethanol is removed by distillation. The residue is 1,7-heptanediol.

It is not intended to restrict the present invention to the foregoing examples which are merely given to demonstrate some of the embodiments of the invention. It should only be limited to the appended claims in which it is intended to claim all of the novelty inherent in the invention as well as the modifications and equivalents coming within the scope and spirit of the invention.

What is claimed is:

1. Process for preparing a non-vicinal glycol from an acyclic $C_4$ to $C_8$ diolefin having one terminal and one internal double bond which comprises reacting 1 to 6 moles of said diolefin with 1 mole of boron hydride at 0 to 30° C. under substantially atmospheric pressure in the pressence of 0.1 to 400 weight percent of a $C_4$ to $C_6$ organic ether, based on said boron hydride and said diolefin, for up to 10 hours thereby forming a polyorgano borane intermediate subjecting said intermediate to temperatures of about 150 to 200° C. for about 1 to 8 hours, contacting said intermediate compound with aqueous hydrogen peroxide at −10 to 100° C. for from a few minutes to 8 hours, under 1 to 3000 p.s.i.g. and recovering a glycol containing primary hydroxy groups.

2. Process according to claim 1 in which the diolefin is heptadiene.

3. Process for preparing a non-vicinal glycol from piperylene which comprises reacting 1 to 6 moles of said piperylene with 1 mole of boron hydride at 0 to 30° C. under substantially atmospheric pressure in the presence of 0.1 to 400 weight percent of a $C_4$ to $C_6$ organic ether, based on said boron hydride and said piperylene, for up to 10 hours thereby forming a polyorgano borane intermediate subjecting said intermediate to temperatures of about 150 to 200° C. for about 1 to 8 hours, contacting said intermediate compound with aqueous hydrogen peroxide at −10 to 100° C. for from a few minutes to 8 hours, under 1 to 3000 p.s.i.g. and recovering a glycol containing alcohol groups in the terminal positions.

References Cited in the file of this patent

UNITED STATES PATENTS

| | | |
|---|---|---|
| 2,977,389 | De Lorenzo et al. | Mar. 28, 1961 |
| 3,008,997 | Saegebarth | Nov. 14, 1961 |

OTHER REFERENCES

"The Chemistry of Organometallic Compounds," Rochow et al., J. Wiley and Sons, 1957, page 61, lines 16 to 20 (1 page).

Brown et al.: "Jour. Org. Chem." 22, pages 1137–38, 1957.

Brown et al.: "J.A.C.S." 81, page 247, 1959.

"Chemical and Engineering News," Jan. 19, 1959, pp. 36 to 37.